Oct. 28, 1958   A. O. LUND ET AL   2,857,986
ELECTRICAL STOPPING OF MOTIVE DEVICES
Filed Sept. 19, 1955   4 Sheets-Sheet 1

Oct. 28, 1958 A. O. LUND ET AL 2,857,986
ELECTRICAL STOPPING OF MOTIVE DEVICES
Filed Sept. 19, 1955 4 Sheets-Sheet 3

United States Patent Office 2,857,986
Patented Oct. 28, 1958

2,857,986

ELECTRICAL STOPPING OF MOTIVE DEVICES

Alvin O. Lund, Great Notch, and William M. Ostrander, Hackensack, N. J., assignors to Westinghouse Electric Corporation, East Pittsburgh, Pa., a corporation of Pennsylvania Application September 19, 1955, Serial No. 535,015

16 Claims. (Cl. 187—29)

This invention relates to motor control systems and it has particular relation to systems wherein a motor is to be stopped at a predetermined point.

For various applications it is desirable to stop a motor accurately and smoothly at a predetermined point. This is particularly desirable for motors in elevator systems designed for moving persons. For this reason the invention will be described with particular relation to elevator systems.

In accordance with the invention, a motor may be supplied with energy for the purpose of producing motion in one direction, for example, a forward direction. When the motor is to be stopped at a predetermined point, a predetermined value of energy is applied to the motor for the purpose of stopping the forward motion of the motor. This energy is applied at a predetermined point in the movement of the motor and has a value selected to stop the motor smoothly at the desired point.

In a preferred embodiment of the invention the energy to stop the motor is stored in one or more storage devices and is applied to the motor through one or more time constant circuits. In a specific embodiment of the invention suitable for elevators having variable voltage control the energy may be stored in one or more capacitors. If the elevator car is to stop at a landing, the field of the generator is coupled for excitation in accordance with the energy stored in the capacitor or capacitors when the elevator car arrives at a predetermined distance from the landing at which it is to stop. The provision of plural sources of stored energies assures more flexible control of the magnitude and duration of the excitation employed for stopping the elevator car. After the elevator car or other load has been completely and smoothly stopped by the stored energy, a mechanical brake may be applied for the purpose of preventing further movement of the elevator car or load.

It is, therefore, an object of this invention to provide improved systems for stopping electromotive devices.

It is a further object of the invention to provide a system for stopping an electromotive device wherein a predetermined value of energy is applied to the device to oppose movement of the device in its initial direction of movement.

It is also an object of the invention to provide an improved system for stopping an electric motor wherein energy stored in one or more storage devices is applied in a stopping direction to the electric motor when the motor arrives at a position which is a predetermined distance in advance of a point at which the motor is to stop.

It is an additional object of the invention to provide a system as defined in the preceding paragraph wherein a mechanical brake is applied after the motor is substantially completely stopped for the purpose of preventing further movement of the motor.

It is another object of the invention to provide an elevator system having variable voltage control wherein energy stored in one or more storage devices is employed for controlling the excitation of the variable voltage generator when the elevator car reaches a point a predetermined distance in advance of a landing at which it is to stop for the purpose of modifying the energization of the variable voltage motor.

It is a still further object of the invention to provide a system as defined in the preceding paragraph wherein a mechanical brake is applied after the variable voltage motor has substantially stopped for the purpose of preventing further movement of the motor.

Other objects of the invention will be apparent from the following description taken in conjunction with the accompanying drawings, in which.

The invention may be applied to various prior art motor control systems. It is particularly suitable for motor control systems wherein the control is exercised through amplifiers such as the rotating amplifiers employing regulating generators and magnetic amplifiers.

Figure 1:
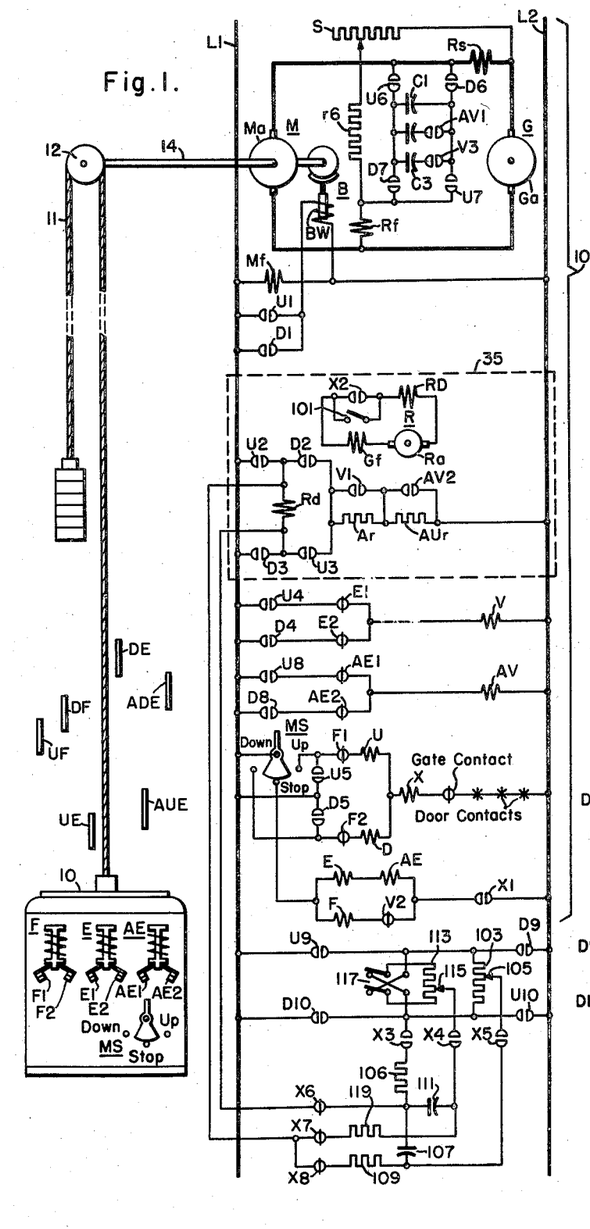
Figure 1 is a schematic view with part shown in perspective and with circuits shown in straight line form of an elevator system embodying the invention.
Figure 1A:
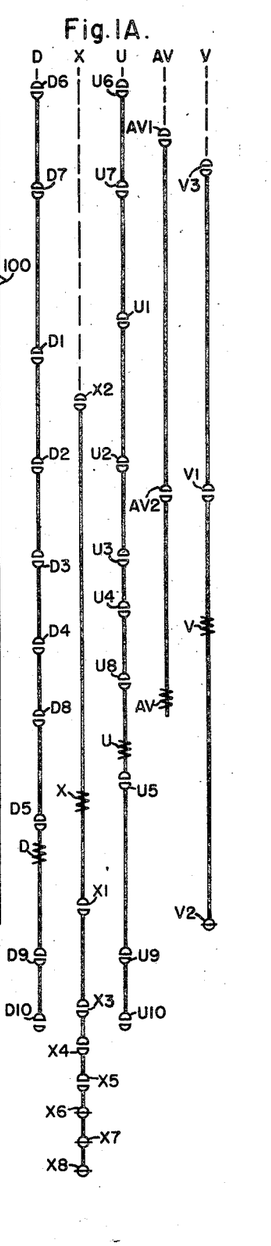
Fig. 1A is a schematic view of relays and switches employed in the system of Fig. 1.

Referring to Fig. 1 an elevator system is illustrated which is based on the elevator system of the Esselman Patent 2,528,126. The circuits of Fig. 1 which are identified by the bracket 100 are similar to the circuits shown in Fig. 1 of the Esselman patent except that the circuits enclosed in the dotted rectangle 35 are replaced by the circuits shown in Fig. 5 of the Esselman patent. This substitution of circuits is also taught in the aforesaid Esselman patent. The only changes in this portion of the circuits identified by the bracket 100 is the addition of a manually-operated switch 101 for shunting the make contacts X2. Since the components which are common to the Esselman patent and to the present showing are identified by the same reference characters and since they are constructed and operated in the manner set forth in the Esselman patent the present discussion will be confined primarily to the circuits which are here shown for the first time.

To facilitate a discussion of the invention, the following list of components common to the Esselman patent and to the present application is presented:

10—Elevator car
11—Cable
12—Sheave
14—Shaft
M—Motor (armature $Ma$, main field winding $Mf$)
G—Generator (armature $Ga$, main field winding $Gf$)
B—Brake
R—Regulator generator (armature $Ra$, field windings $Rd$, $Rf$, $RD$, $Rs$)
$Bw$—Brake releasing winding
DE, ADE, DF, UF, AUE, UE—Inductor plates
S, $r6$, $Ar$, $AVr$—Resistors
V—Speed relay
AV—Auxiliary speed relay
U—Up switch
X—Auxiliary switch
D—Down switch
E—Inductor relay
AE—Inductor relay
F—Landing inductor relay These components are identical in the present case and in the aforesaid patent except that in the present case contacts are added to the up switch U, the down switch D and the auxiliary switch X. Also the brake releasing winding Bw is designed to release the brake with a slight delay for the purpose presented below.

By reference to the Esselman patent it will be found that when the car reaches a predetermined distance in advance of a landing at which the car is to stop, the make contacts X2 opens to deenergize the generator field winding Gf and the make contacts U1 or D1 (depending on whether the car is traveling up or down) open to deenergize the brake releasing winding Bw. For braking purposes this occurs when the car is ½ inch from the floor of the load or floor at which it is to stop. The elevator car now drifts against the resistance of the brake B for a distance of approximately ½ inch to stop accurately at the floor.

In accordance with the present invention, when the elevator car reaches a predetermined distance in advance of the landing at which it is to stop a pulse of energy is applied to the generator field winding Gf which is in a direction opposite to the direction of energization of this winding while the car is running. The pulse is proportioned to modify the excitation to bring the motor smoothly to a stop when the elevator car is exactly at the landing at which it is to stop. At this time, the delay of the brake releasing winding Bw expires and the brake B sets to prevent further movement of the motor M. Inasmuch as the actual stop is produced electrically, an extremely smooth stop is assured.

The pulse for the field winding Gf conveniently may be supplied by the application of a suitable pulse to the field winding Rd of the regulator generator. A circuit for providing the desired pulse now will be considered.

With reference to Fig. 1, it will be noted that a resistor 103 is connected across the buses L1 and L2 through a reversing switch made up of make contacts U9 and U10 of the up switch U and make contacts D9 and D10 of the down switch D. These contacts are added to the up switch and the down switch of the Esselman patent. If the buses L1 and L2, respectively, are positive and negative buses, it follows that if the elevator car is conditioned for up travel the contacts U9 and U10 will be closed and the upper terminal of resistor 103 will be positive with respect to the lower terminal as viewed in Fig. 1. A reverse polarity is provided during down travel of the elevator car. The resistor 103 is provided with an adjustable tap 105.

When the elevator car is running, the make contacts X3 and X5 are closed to connect an adjustable portion of the resistor 103 across a capacitor 107 through a resistor 106. The contacts X3 and X5 are added to the auxiliary switch X of the Esselman patent. Consequently, when the elevator car is running a quantity of energy is stored in the capacitor 107 which depends on the capacitance of the capacitor and on the magnitude of the voltage applied thereacross. Also the polarity of the charge on the capacitor depends on the direction of travel of the elevator car. When the elevator car reaches a point which may be ½ inch away from the landing at which the elevator car is to stop the contacts U2, D2, D3 and U3 all are open to disconnect the field winding Rd of the regulator generator from the buses L1 and L2. In addition, the break contacts X6 and X8 close to connect the capacitor 107 across the field winding Rd through the resistor 109. The contacts X6 and X8 also are added to the auxiliary switch X of the Esselman patent.

The capacitor 107 now discharges through the field winding Rd at a rate determined by the time constant of the discharge circuit. This discharge is in a direction opposite to the direction of current through the winding while the elevator car is running. The resultant excitation of the generator G modifies the armature current previously supplied to the motor M and the motor M now develops a torque which is proportioned to bring the elevator car to a stop. The charge on the capacitor 107 and the time constant of the discharge circuit are proportioned to bring the elevator car to a stop accurately at the desired landing. As the elevator car comes to a stop the brake B is applied to prevent further movement of the elevator car.

Although good results have been obtained from the provision of the single storage device or capacitor 107 a more flexible control may be exercised by the provision of an additional capacitor 111. When the elevator car is running the make contacts X3 and X4 are closed to connect the capacitor 111 through the resistor 106 across an adjustable portion of a resistor 113 having an adjustable tap 115. The resistor 113 is connected in parallel with the resistor 103 through a reversing switch 117.

When the elevator car nears a landing at which it is to stop the make contacts X3 and X4 open to interrupt the charging circuit for the capacitor 111 and the break contacts X6 and X7 close to connect the capacitor 111 through the resistor 119 across the field winding Rd. Consequently, the capacitors 111 and 107 are connected in parallel to the same field winding. By controlling the charge on each of the capacitors and by controlling the time constant of each of the discharge circuits the desired magnitude and shape of the stopping pulse may be applied to the field winding RD. For example, the capacitor 107 may have a low time constant proportioned to apply a short pulse to the field winding for the purpose of rapidly slowing the elevator car. The capacitor 111 may have a smaller charge and its discharge circuit may have a longer time constant to assure holding of the elevator car at the floor until the brake is fully set.

The polarity of the charge on the capacitor 111 may be reversed by manipulation of the reversing switch 117. For example, if the parameters of the system are such that the elevator car may tend to resume its initial direction of movement after the capacitor 107 is substantially discharged the polarity of the capacitor 111 may be selected to prevent such resumption of movement of the elevator car. On the other hand if the capacitor 107 is designed to produce a pulse which may result in actual reversal of the movement of the elevator car, the polarity of the capacitor 111 may be selected to oppose the excitation of the field winding Rd produced by the capacitor 107.

Fig. 1 illustrates a rotating amplifier employing the regulator generator R. The invention may also be applied to a system employing other types of regulating devices such as the magnetic amplifier illustrated in Fig. 2.

Figure 2:
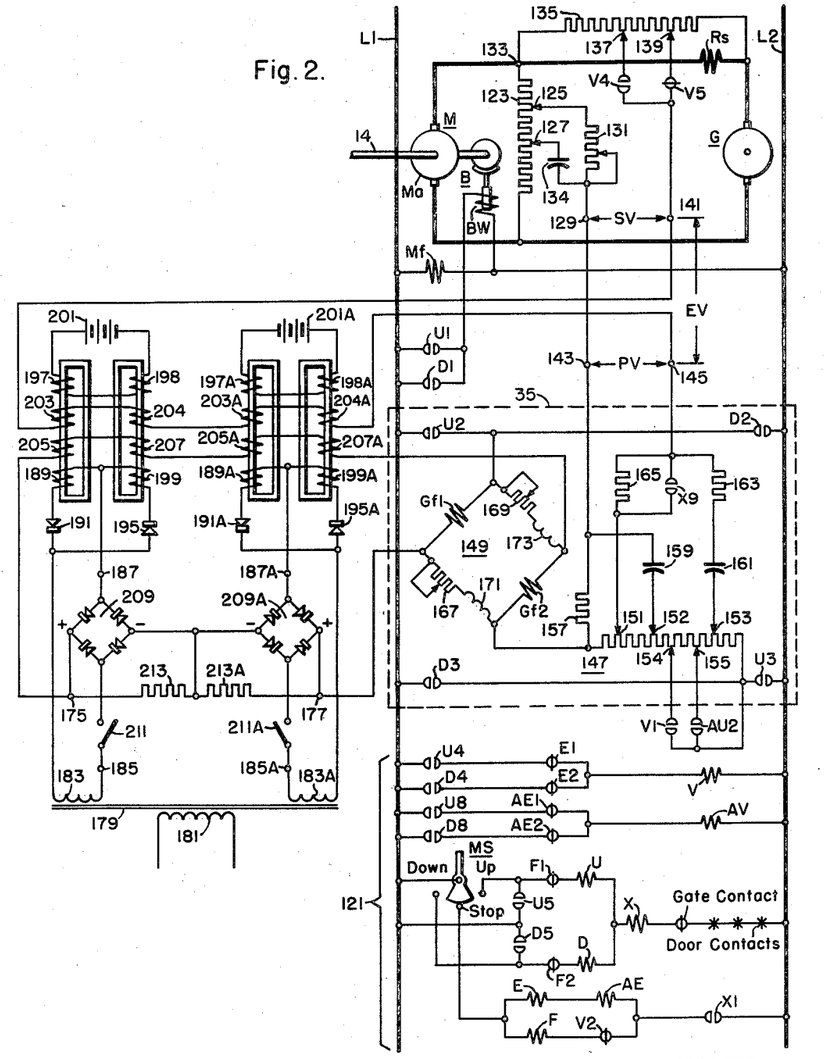
Figs. 2, 3 and 4 are schematic views with circuits shown in straight line form illustrating further modifications of the invention.

In the embodiment of Fig. 2 the circuits identified by the bracket 121 are similar to those shown in Fig. 1 and similar components are identified by the same reference characters. Consequently, the discussion of Fig. 2 will be confined primarily to the new circuits shown therein.

The armatures of the motor M and the generator G are connected in a loop through windings Rs in the manner set forth in Fig. 1. The windings Rs may include the interpole windings of the generator and of the motor if such windings are employed. Also the circuit for the brake B and the motor field winding Mf are similar to those shown in Fig. 1.

A voltage SV is derived which is representative of the speed of the motor M. This may be obtained in any conventional manner such as from a tachometer generator driven by the motor M. For present purposes it will be assumed that the voltage SV is derived from static components. To this end a resistor 123 is connected across the terminals of the motor armature Ma and this resistor is provided with two taps 125 and 127. The tap 125 is connected to a terminal 129 through an adjustable resistor 131. Consequently, a voltage S appears across the terminal 129 and a terminal 133 of the resistor 123 which is proportional to the voltage applied to the armature Ma. For damping purposes, a capacitor 134 is connected between the terminal 129 and the tap 127.

Because of the resistance drop in the armature of the motor M the voltage across the resistor 123 is not exactly proportional to the speed of the motor. To compensate for the resistance drop, a second voltage is provided which is proportional to current flowing through the armature Ma. Conveniently, this voltage may be obtained from a resistor 135 which is connected across the field winding Rs. This resistor has two taps 137 and 139 which are connected to a terminal 141 respectively through make contacts V4 and break contacts V5 of the speed relay V. The variation of the voltage derived from the resistor 135 may be desirable to compensate for variations in compounding of the variable voltage system. The voltage SV appearing between the terminals 129 and 141 accurately represents the speed of the motor M. A somewhat similar system for obtaining a voltage proportional to the motor speed is shown in the Lund et al. Patent 2,508,179.

The speed voltage SV is compared to a pattern voltage PV which appears between two terminals 143 and 145. The difference between these voltages represents an error voltage EV which appears between the two terminals 141 and 145.

The pattern voltage PV is derived from a resistor 147 which is connected in series with a bridge circuit 149 across the buses L1 and L2 through a reversing switch represented by the make contacts U2 and U3 of the up switch U and the make contacts D2 and D3 of the down switch D. Consequently, a voltage drop appears across the resistor 147 having a polarity dependent on the direction of travel of the elevator car. The resistor 147 has five taps 151, 152, 153, 154 and 155 associated therewith. When the elevator car is running, the terminal 145 is connected to the tap 151 through the make contacts X9 of the auxiliary switch X. The terminal 143 is connected to the left hand terminal of the resistor 147 as viewed in Fig. 2 through a resistor 157. For damping purposes a capacitor 159 is connected across the resistor 157 and a portion of the resistor 147. The taps 154 and 155 are connected to the right hand terminal of the resistor 147 as viewed in Fig. 2 respectively through the make contacts V1 and the make contacts AV2 and the speed relay V and the auxiliary speed relay AV. The capacitor 159 prevents sudden changes in the pattern voltage resulting from operation of the contacts V1 and AV2.

When the elevator car is running, a capacitor 161 is connected across the taps 151 and 153 through a resistor 173 and the make contact X9. The make contacts X9 are shunted by a resistor 165.

The generator field winding is divided into two equal portions Gf1 and Gf2 which are located respectively in two arms of the bridge 149. Each of the remaining arms of the bridge includes an adjustable resistor respectively 167 and 169 and a choke coil respectively 171 and 173. Resistors and choke coils in the two arms are identical. The choke coils are employed for limiting the flow of ripples or alternating current through the arms of the bridge.

Additional energization for the field winding of the generator G is provided by connecting the output terminals 175 and 177 of a magnetic amplifier across a diagonal of the bridge. This magnetic amplifier now will be discussed.

The magnetic amplifier receives energy from a transformer 179 having a primary winding 181 connected to a suitable source of alternating current. Such a source may be a conventional power source having a voltage of 240 volts and a frequency of 60 cycles per second. The transformer has two secondary windings 183 and 183A. The secondary winding 183 is connected across two terminals 185 and 187 through two paths. One of the paths includes a saturable reactor 189 and a unidirectional rectifier 191. The other path includes a saturable reactor 193 and a unidirectional rectifier 195. The rectifiers are so poled that they pass current in opposite directions between the terminals 185 and 187.

The current which can be supplied to a load connected to the terminals 185 and 187 depends on the saturation of the cores of the reactors 189 and 199. Such saturation is controlled by means of control windings in a manner well understood in the art. Preferably, one set of control windings 197 and 198 are energized from a suitable source of direct current represented by a battery 201 and serve as biasing windings for the magnetic amplifier. A second set of control windings 203 and 204 are connected in series for energization in accordance with the error voltage EV. If desired, the amplification of the magnetic amplifier may be improved by a third set of control windings 205 and 207 which are energized in accordance with the output of the magnetic amplifier. These will be referred to as aiding windings.

The output of the magnetic amplifier if derived directly from the terminals 185 and 187 will be an alternating current output. To provide a direct current output a full-wave rectifier 209 has its input terminals connected across the terminals 185 and 187 through a switch 211 and has its output terminals connected across a load resistor 213.

The secondary winding 183A has a similar magnetic amplifier associated therewith and the various components of this magnetic amplifier are identified by the same reference characters employed for the first-named magnetic amplifier followed by the suffix "A." It will be noted that the control windings 203, 204, 203A and 204A are connected in series for energization in accordance with the error voltage EV. The aiding windings 205, 207, 205A and 207A and the resistors 213 and 213A all are connected in series across the diagonal of the bridge 149.

The control windings 203 and 205 aid each other in producing saturation of the saturable reactor 189. Similarly the aiding windings 204 and 207 aid each other in producing saturation of the winding 193.

It will be noted that the output of the rectifier 209 is a unidirectional output. To provide a reversible output across the terminals 175 and 177, the polarity of the output of the rectifier 209A is reversed relative to that of the rectifier 209. Polarity markings are indicated by positive (+) and negative (−) markings in Fig. 2. It will be noted further that the polarity of the battery 201 is reversed relative to that of battery 201A. Consequently, if a zero error voltage is present, the voltages across the resistors 213 and 213A oppose each other and the resultant voltage thereacross is zero. If the error voltage EV has a first polarity the control windings 197, 198, 203, 204, 205 and 207 develop magnetomotive forces acting in the same direction in their magnetic circuits and the voltage across the resistor 213 is substantially increased. At the same time, the magnetomotive force developed by the control winding 197A opposes those of the windings 203A and 205A with respect to the saturable reactor 189A and the magnetomotive force developed by the control winding 198A opposes those of the windings 204A and 207A for the saturable reactors 199A. Consequently, the saturable reactors 189A and 199A are relatively unsaturated and a relatively small voltage appears across the resistor 213A. Inasmuch as the voltage across the resistor 213 is larger than that across the resistor 213A, the terminal 175 is positive with respect to the terminal 177. Should the polarity of the error voltage reverse, the terminal 177 would become positive with respect to the terminal 175.

Let it be assumed that the elevator car of Fig. 2 is conditioned for operation in the up direction. Under such conditions the make contacts U2 and U3 are closed to energize the generator field windings Gf1 and Gf2 with proper polarity for up travel of the elevator car. In addition, make contacts X9 are closed and the capacitor 161 is charged. The make contacts V4 are closed and the make contact V5 is open for supplying the proper compensating voltage from the compensator 135. In addition, make contacts V1 and V2 may be closed to shunt a portion of the resistor 147.

As the elevator car starts, the pattern voltage PV exceeds the speed voltage SV substantially and an error voltage EV is applied to the windings 203, 204, 203A and 204A. Consequently, the magnetic amplifier produces a substantial output of the proper polarity to increase the excitation of the generator field windings, and the elevator car accelerates rapidly to a desired speed. As the desired speed is approached, the speed voltage increases and the error voltage decreases causing the output of the magnetic amplifier to decrease.

When the elevator car nears a landing at which it is to stop the make contacts V1 and AV2 open to slow down the elevator car. In addition, make contacts V4 and break contacts V5 close to correct the compensation of the speed voltage.

When the elevator car reaches a predetermined distance from the landing at which it is to stop, say ½ inch, the contacts U2 and U3 open to disconnect the generator field windings Gf1 and Gf2 from the buses. At the same time make contacts X9 open and the capacitor 161 now discharges through a portion of the resistor 147, the time constant of the discharge circuit depending in part on the values of the resistors 163 and 165. The pattern voltage energizes the magnetic amplifier to produce an output capable of energizing the generator field windings in a reverse direction. This rapidly brings the elevator car to a smooth stop. As in the case previously discussed the brake B is given a time delay such that it sets substantially as the elevator car reaches a fully-stopped condition.

In the embodiment of Fig. 1 the invention is applied to an elevator system employing a rotating amplifier or regulating generator in what is known in the trade as an exciter-type circuit. The invention may also be applied to a motor control system wherein a rotating amplifier or rotating regulating generator is employed in what is know as a bridge-type circuit, and such as system is illustrated in Figs. 3 and 4.

Figure 3:
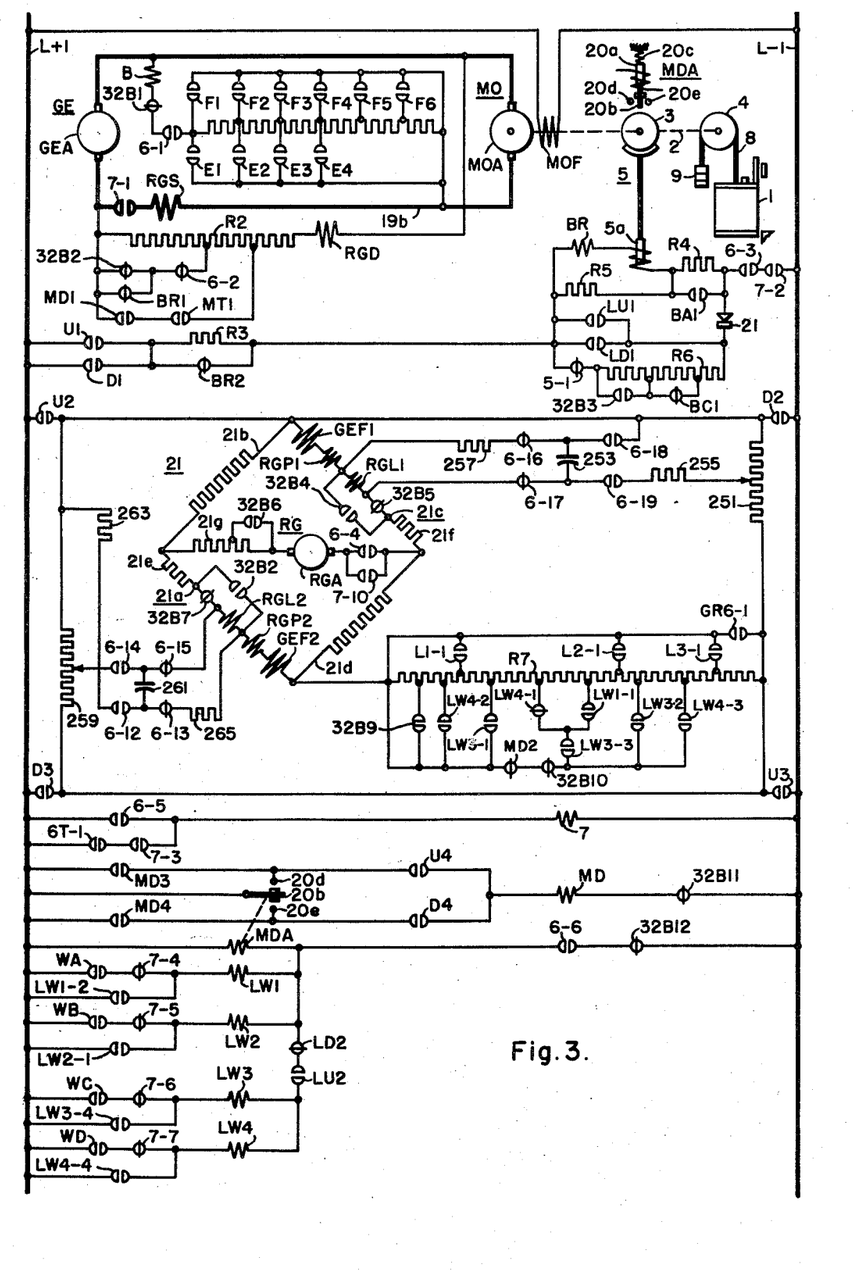
Figure 4:
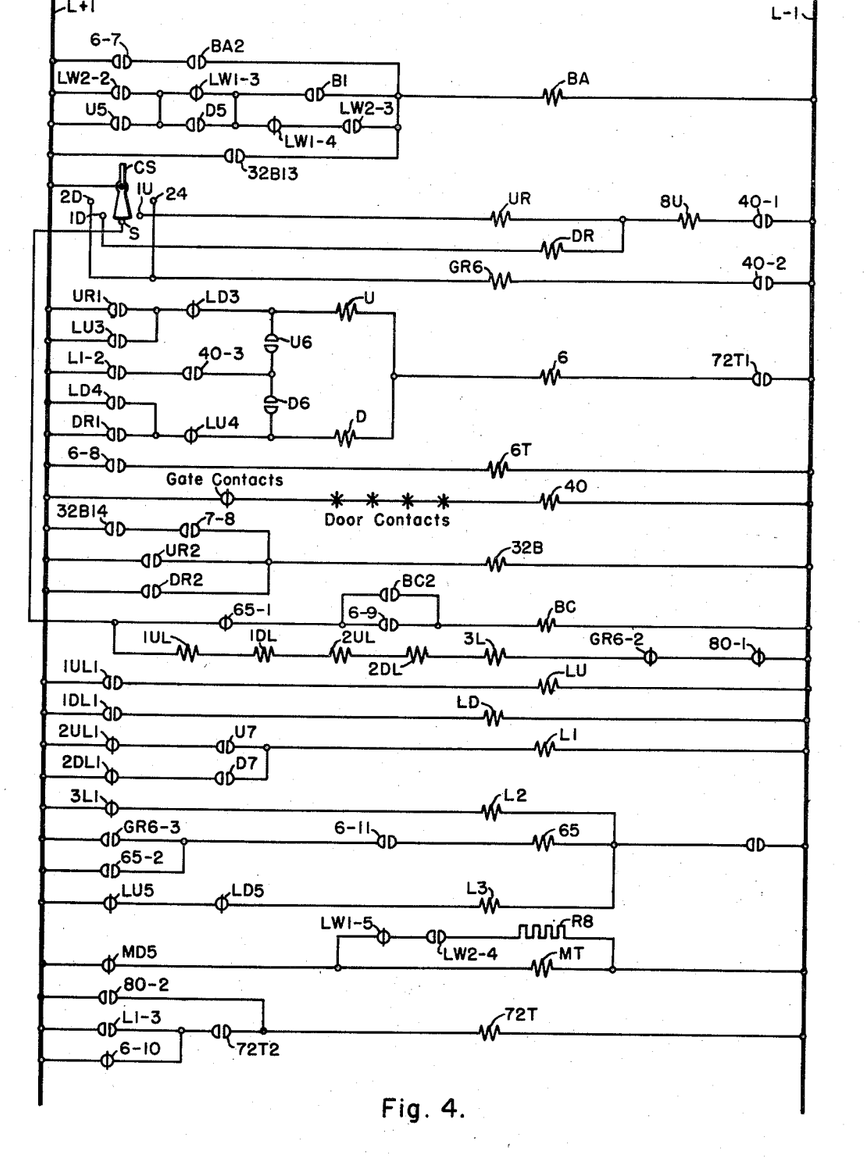

Figs. 3 and 4 reproduce in its entirety the system illustrated in Figs. 5 and 6 of the Santini et al. Patent 2,674,348. The following reference characters identify similar components in the present Figs. 3 and 4 and in the aforesaid Santini patent.

GR6—Full speed relay
E1–E4—Light-load contacts
F1–F6—Heavy-load contacts
WA, WB, WC, WD—Auxiliary load contacts
B—Loop voltage relay
BR—Brake-released relay
7—Running contactor
MD—Motion detector relay
MDA—Motion detector advancer
LW1–LW4—Load zone relays
BA—Brake relay
UR—Up relay
DR—Down relay
6—Running relay
80—Auxiliary running relay
U—Up switch
D—Down switch
6T—Timing relay
40—Door relay
32B—Cable-stretch relay
BC—Brake-modifier relay
LU—Up leveling relay
LD—Down leveling relay
L1—Third landing relay
L2—Second landing relay
L3—Leveling-field-control relay
65—Brake regulator relay
MT—Timing relay
72T—Timing relay 1U1, 2D1, 3L, 2UL, 1DL—Inductor relays
1—Elevator car
GE—Generator
MO—Motor
RG—Regulating generator
5—Brake The only difference between the components are the provisions of a delay in setting of the brake 5 as here employed following opening of the contact 4–3 in order to permit complete electrical stopping of the elevator car and the addition of a number of contacts to the running relay 6. Since the construction of the system is fully set forth in the Santini et al. patent and since the operation thereof is also set forth in the patent, the present discussion will be confined to the additions to the system of the Santini et al. patent.

By reference to Fig. 3 it will be observed that a resistor 251 is connected across the buses L+1 and L—1 through the reversing switch represented by the make contact U2, D2, D3 and U3. Consequently, the polarity of the voltage drop across this resistor depends upon the direction of travel of the elevator car.

When the elevator car is running the make contacts 6–18 and 6–19 are closed to connect a capacitor 253 through a resistor 255 across an adjustable part of the resistor 251. Consequently, when the elevator car is running the capacitor 253 receives a charge dependent on the capacitance thereof and on the voltage applied thereto from the resistor 251.

When the elevator car reaches a predetermined distance from a floor or landing at which it is to stop the break contacts 6–16 and 6–17 of the relay 6 close to connect the capacitor 253 through a resistor 257 across the field winding RGL1 of the regulating generator RG. The polarity of the current driven through the winding RGL1 by the capacitator 253 is in a direction such that the regulating generator RG reverses the energization of the generator field windings GEF1, GEF2 in order to bring the elevator car smoothly and rapidly to a stop. As the elevator car comes to a complete stop the brake 5 sets to prevent further movement of the elevator car.

As previously pointed out, a more flexible control may be exercised by the provision of a plurality of sources of stored energy. The sources of stored energy may be connected to the same or different field windings. To this end a resistor 259 is connected in parallel with the resistor 251. When the elevator car is running, the make contacts 6–12 and 6–14 of the running relay 6 are closed to connect a capacitor 261 through a resistor 263 across an adjustable part of the resistor 259. As a result, the capacitor is charged to an extent dependent on the capacitance of the capacitor and on the voltage applied thereto from the resistor 259.

When the elevator car reaches a predetermined distance from a landing or floor at which it is to stop, such as a distance of ½ inch in advance of the floor, the running relay 6 drops out. It opens make contact 6–12 and 6–14 for the purpose of interrupting the charging circuit for the capacitor 261. In addition, the running relay closes its break contacts 6–13 and 6–15 to connect the capacitor 261 through a resistor 265 across the auxiliary field winding RGL2 of the regulating generator. The capacitor now discharges through the field winding a current dependent on the parameters of the system. The capacitor 261 may be connected to direct a current through the field winding RGL2 in a direction causing the regulating generator RG to energize the generator field winding GEF1 and GEF2 in either of two directions. For present purposes, it will be assumed that such energizations of the generator field winding GEF1 and GEF2 are in directions tending to continue the motion of the elevator car in the direction of approach of the elevator car. Thus, the discharge of the capacitor 253 may be of sufficient magnitude to stop the elevator car and to reverse the direction of the elevator car. However, the discharge of the capacitor 261, which may be through a circuit having a longer time constant, counteracts the tendency of the elevator car to reverse, and holds the elevator car stationary until the brake 5 is completely set.

Although the invention has been described with reference to certain embodiments thereof, numerous other modifications falling within the spirit and scope of the invention are possible.

We claim as our invention:

1. In a motive system, a structure having a stopping point, a movable device, means mounting the movable device for movement relative to the structure towards the stopping point, electromotive means for urging the movable device in first and second directions, and control means for stopping the movable device accurately at said stopping point, said control means comprising storage means for storing a predetermined amount of electric energy, and coupling means responsive to a predetermined approach of the movable device in the first direction toward the stopping point for coupling the storage means to the electromotive means to energize the electromotive means with said predetermined amount of electric energy, said predetermined amount being selected to energize said electromotive means in a direction and in an amount sufficient to bring the movable device to a stop accurately at said stopping point.

2. In combination, a dynamo-electric machine having field-excitation means and having a rotor, a magnetic amplifier having a variable-voltage input circuit and having a direct current output circuit of a variable voltage of one sense, a second magnetic amplifier having a variable voltage input circuit and having a direct current output circuit of a variable voltage of an opposite sense, coupling means connecting said field-excitation means to the output circuits to provide field-excitation for the dynamo-electric machine and rotation of the rotor dependent on the difference of the voltage outputs of said output circuits, and speed-control means responsive to a predetermined condition for applying to the field-excitation means while the rotor is rotating an input pulse of predetermined magnitude and duration, said pulse having a sense selected to produce a torque opposing rotation of the rotor.

3. In an elevator system, a structure having a landing, an elevator car, means mounting the elevator car for movement relative to the structure towards and away from the landing, electroresponsive motive means effective when energized for moving the elevator car in first and second directions, and control means for stopping the elevator car accurately at said landing, said control means comprising means operable for electrically energizing the motive means to move the elevator car in the first direction towards said landing from a point displaced from the landing, stopping means responsive to arrival of the elevator car at a predetermined position displaced from the landing for applying to the motive means a predetermined quantity of electric energy for energizing the motive means to urge the elevator car in the second direction, said predetermined quantity being proportioned to bring the elevator car to a stop accurately at said landing, and mechanical brake means effective substantially as the elevator car stops at said landing for braking said elevator car to prevent subsequent movement thereof.

4. In an elevator system, a structure having a landing, an elevator car, means mounting the elevator car for movement relative to the structure towards and from the landing, means including a direct current motor having an armature effective when energized for moving the elevator car in first and second directions, a direct-current generator having an armature coupled to the motor armature and having field means, and control means for moving the elevator car and stopping the elevator car at said landing, the control means comprising means selectively operable for energizing the field-excitation means with a running energization in either of two senses to produce movement of the elevator car in the first direction or the second direction respectively, means responsive to arrival of the elevator car at a predetermined distance from the landing when the car is to stop at the landing for replacing the running energization of the field-excitation means with a predetermined stopping energization effective to develop a force in said motor opposing further movement of the elevator car, said force being proportioned to bring the car to a stop accurately at the landing.

5. In a motive system, a structure having a stopping point, a movable device, means mounting the movable device for movement relative to the structure towards the stopping point, electromotive means for urging the movable device in first and second directions, and control means for stopping the movable device accurately at said stopping point, said control means comprising storage means for storing a predetermined amount of electric energy, coupling means responsive to a predetermined approach of the movable device in the first direction toward the stopping point for coupling the storage means to the electromotive means to energize the electromotive means with said predetermined amount of electric energy, said predetermined amount being selected to energize said electromotive means in a direction and in an amount sufficient to bring the movable device to a stop accurately at said stopping point, the storage means comprising a capacitor, and means effective during operation of the movable device for storing a predetermined quantity of electricity in the capacitor.

6. In a motive system, a structure having a stopping point, a movable device, means mounting the movable device for movement relative to the structure towards the stopping point, electromotive means for urging the movable device in first and second directions, and control means for stopping the movable device accurately at said stopping point, said control means comprising storage means for storing a predetermined amount of electric energy, coupling means responsive to a predetermined approach of the movable device in the first direction toward the stopping point for coupling the storage means to the electromotive means to energize the electromotive means with said predetermined amount of electric energy, said predetermined amount being selected to energize said electromotive means in a direction and in an amount suffiicent to bring the movable device to a stop accurately at said stopping point, the storage means comprising a pair of capacitors, and means effective during operation of the stopping device for storing predetermined quantities of electricity in the capacitors, said coupling means comprising electric circuit components for coupling the capacitors to the electromotive means to establish a separate discharge circuit for each of the capacitors, said circuits having different time constants.

7. In a motive system, a structure having a stopping point, a movable device, means mounting the movable device for movement relative to the structure towards the stopping point, electromotive means for urging the movable device in first and second directions, and control means for stopping the movable device accurately at said stopping point, said control means comprising storage means for storing a predetermined amount of electric energy, and coupling means responsive to a predetermined approach of the movable device in the first direction toward the stopping point for coupling the storage means to the electromotive means to energize the electromotive means with said predetermined amount of electric energy, said predetermined amount being selected to energize said electromotive means in a direction and in an amount sufficient to bring the movable device to a stop accurately at said stopping point, the electromotive means comprising a direct current electric motor having an armature, said control means comprising a direct-current main generator having an armature coupled to the armature of the motor, said generator having field excitation means, a direct-current regulating generator having an armature coupled to field excitation means for exciting the main generator, said regulating generator having field excitation means, said coupling means comprising circuit elements for coupling the storage means to the field excitation means of the regulating generator for conditioning the regulating generator to excite the main generator to an extent sufficient to stop the movable device accurately at the stopping point.

8. In a motive system, a structure having a stopping point, a movable device, means mounting the movable device for movement relative to the structure towards the stopping point, electromotive means for urging the movable device in first and second directions, and control means for stopping the movable device accurately at said stopping point, said control means comprising storage means for storing a predetermined amount of electric energy, coupling means responsive to a predetermined approach of the movable device in the first direction toward the stopping point for coupling the storage means to the electromotive means to energize the electromotive means with said predetermined amount of electric energy, said predetermined amount being selected to energize said electromotive means in a direction and in an amount sufficient to bring the movable device to a stop accurately at said stopping point, the electromotive means comprising a direct current electric motor having an armature, said control means comprising a direct-current main generator having an armature coupled to the armature of the motor, said generator having field excitation means, a direct-current regulating generator having an armature coupled to field excitation means for exciting the main generator, said regulating generator having field excitation means, said coupling means comprising circuit elements for coupling the storage means to the field excitation means of the regulating generator for conditioning the regulating generator to excite the main generator to an extent sufficient to stop the movable device accurately at the stopping point, the storage means comprising a plurality of capacitors, and means effective during operation of the movable device for charging the capacitors, said coupling means comprising circuit elements for establishing a different discharge circuit for each of the capacitors, said discharge circuits having different time constants.

9. In combination, a dynamo-electric machine having field-excitation means and having a rotor, a magnetic amplifier having a variable-voltage input circuit and having a direct current output circuit of a variable voltage of one sense, a second magnetic amplifier having a variable voltage input circuit and having a direct current output circuit of a variable voltage of an opposite sense, coupling means connecting said field-excitation means to the output circuits to provide field-excitation for the dynamo-electric machine and rotation of the rotor dependent on the difference of the voltage outputs of said output circuits, speed-control means responsive to a predetermined condition for applying to the field-excitation means while the rotor is rotating an input pulse of predetermined magnitude and duration, said pulse having a sense selected to produce a torque opposing rotation of the rotor, the speed control means comprising energy storage means for supplying said pulse, and means for stopping the rotor, said last-named means including means responsive to a predetermined rotor position during a stopping operation for coupling the energy storage means to the field-excitation means for applying said pulse to the field-excitation means.

10. In combination, a dynamo-electric machine having field-excitation means and having a rotor, a magnetic amplifier having a variable-voltage input circuit and having a direct current output circuit of a variable voltage of one sense, a second magnetic amplifier having a variable voltage input circuit and having a direct current output circuit of a variable voltage of an opposite sense, coupling means connecting said field-excitation means to the output circuits to provide field-excitation for the dynamo-electric machine and rotation of the rotor dependent on the difference of the voltage outputs of said output circuits, speed-control means responsive to a predetermined condition for applying to the field-excitation means while the rotor is rotating an input pulse of predetermined magnitude and duration, said pulse having a sense selected to produce a torque opposing rotation of the rotor, the speed control means comprising a plurality of energy storage means for supplying said pulse, and means for stopping the rotor, said last-named means including means responsive to a predetermined rotor position during a stopping operation for coupling each of the energy storage means to the field-excitation means through a circuit for applying a pulse to the field-excitation means, the circuits for the energy-storage means having different time constants.

11. In an elevator system, a structure having a landing, an elevator car, means mounting the elevator car for movement relative to the structure towards and away from the landing, electroresponsive motive means effective when energized for moving the elevator car in first and second directions, and control means for stopping the elevator car accurately at said landing, said control means comprising means operable for electrically energizing the motive means to move the elevator car in the first direction towards said landing from a point displaced from the landing, stopping means responsive to arrival of the elevator car at a predetermined position displaced from the landing for applying to the motive means a predetermined quantity of electric energy for energizing the motive means to urge the elevator car in the second direction, said predetermined quantity being proportioned to bring the elevator car to a stop accurately at said landing, and mechanical brake means effective substantially as the elevator car stops at said landing for braking said elevator car to prevent subsequent movement thereof, the stopping means comprising energy storage means for storing a predetermined quantity of energy during movement of the elevator car and coupling means responsive to arrival of the elevator car at said predetermined position for coupling the energy storage means to energize said motive means in accordance with said stored energy to urge the elevator car in the second direction.

12. In an elevator system, a structure having a landing, an elevator car, means mounting the elevator car for movement relative to the structure towards and away from the landing, electroresponsive motive means effective when energized for moving the elevator car in first and second directions, and control means for stopping the elevator car accurately at said landing, said control means comprising means operable for electrically energizing the motive means to move the elevator car in the first direction towards said landing from a point displaced from the landing, stopping means responsive to arrival of the elevator car at a predetermined position displaced from the landing for applying to the motive means a predetermined quantity of electric energy for energizing the motive means to urge the elevator car in the second direction, said predetermined quantity being proportioned to bring the elevator car to a stop accurately at said landing, and mechanical brake means effective substantially as the elevator car stops at said landing for braking said elevator car to prevent subsequent movement thereof, the stopping means comprising a plurality of electrical circuits having different time constants, and coupling means responsive to arrival of the elevator car at said predetermined position for coupling the electrical circuits to pass currents controlled by said time constants, said currents energizing the motive means in accordance with the resultant of said currents for urging the elevator car in the second direction.

13. In an elevator system, a structure having a landing, an elevator car, means mounting the elevator car for movement relative to the structure towards and from the landing, means including a direct current motor having an armature effective when energized for moving the elevator car in first and second directions, a direct-current generator having an armature coupled to the motor armature and having field means, and control means for moving the elevator car and stopping the elevator car at said landing, the control means comprising means selectively operable for energizing the field-excitation means with a running energization in either of two senses to produce movement of the elevator car in the first direction or the second direction respectively, means responsive to arrival of the elevator car at a predetermined distance from the landing when the car is to stop at the landing for replacing the running energization of the field-excitation means with a predetermined stopping energization effective to develop a force in said motor opposing further movement of the elevator car, said force being proportioned to bring the car to a stop accurately at the landing, the stopping energization being derived from energy storage means which stores a predetermined quantity of energy during running of the elevator car.

14. In an elevator system, a structure having a landing, an elevator car, means mounting the elevator car for movement relative to the structure towards and from the landing, means including a direct current motor having an armature effective when energized for moving the elevator car in first and second directions, a direct-current generator having an armature coupled to the motor armature and having field means, and control means for moving the elevator car and stopping the elevator car at said landing, the control means comprising means selectively operable for energizing the field-excitation means with a running energization in either of two senses to produce movement of the elevator car in the first direction or the second direction respectively, means responsive to arrival of the elevator car at a predetermined distance from the landing when the car is to stop at the landing for replacing the running energization of the field-excitation means with a predetermined stopping energization effective to develop a force in said motor opposing further movement of the elevator car, said force being proportioned to bring the car to a stop accurately at the landing, the stopping energization being derived from a plurality of electrical circuits each having a different time constant and each including an energy storage device which stores a predetermined amount of energy during the running of the elevator car, said electrical circuits being placed in condition to discharge the associated stored energies in response to arrival of the elevator car at said predetermined distance, said stopping energization being dependent on the resultant of the currents flowing in the electrical circuits and being proportioned to bring the car to a stop accurately at the landing and to hold the car stopped for a time, and mechanical braking means responsive to a stopping operation of the car for braking the car after the car has been stopped by the stopping energization.

15. In a motive system, a structure having a stopping point, a movable device, means mounting the movable device for movement relative to the structure in a path including said stopping point, electromotive means effective when electrically energized in a first sense for urging the movable device along said path in a first direction, said electromotive means being effective when energized in a second sense for urging the movable device along said path in a second direction, and control means operable while the movable device is approaching the stopping point in the first direction for stopping the movable device accurately at said stopping point, said control means including means for supplying a predetermined amount of electrical energy to the electromotive means in a sense for causing the electromotive means to oppose motion of the movable device in the first direction, and means responsive to the arrival of the movable device during travel in the first direction at a predetermined position in advance of the point at which it is to stop for supplying said predetermined amount of electrical energy to the electromotive means, said predetermined amount being proportioned to stop the movable device accurately at said predetermined stopping point.

16. In a motive system, a structure having a stopping point, a movable device, means mounting the movable device for movement relative to the structure in a path including said stopping point, electromotive means effective when electrically energized in a first sense for urging the movable device along said path in a first direction, said electromotive means being effective when energized in a second sense for urging the movable device along said path in a second direction, and control means operable while the movable device is approaching the stopping point in the first direction for stopping the movable device accurately at said stopping point, said control means including means for supplying a predetermined amount of electrical energy to the electromotive means in a sense for causing the electromotive means to oppose motion of the movable device in the first direction, and means responsive to the arrival of the movable device during travel in the first direction at a predetermined position in advance of the point at which it is to stop for supplying said predetermined amount of electrical energy to the electromotive means, said predetermined amount being proportioned to stop the movable device accurately at said predetermined stopping point, a mechanical brake device for retaining the movable device in stopped position, and means responsive to said stopping of the movable device at the stopping device for applying the mechanical brake device substantially as the movable device comes to a complete stop.

References Cited in the file of this patent

UNITED STATES PATENTS

| | | |
|---|---|---|
| 2,508,179 | Lund et al. | May 16, 1950 |
| 2,620,898 | Lund | Dec. 9, 1952 |
| 2,669,324 | Lund | Feb. 2, 1954 |